Patented June 14, 1927.

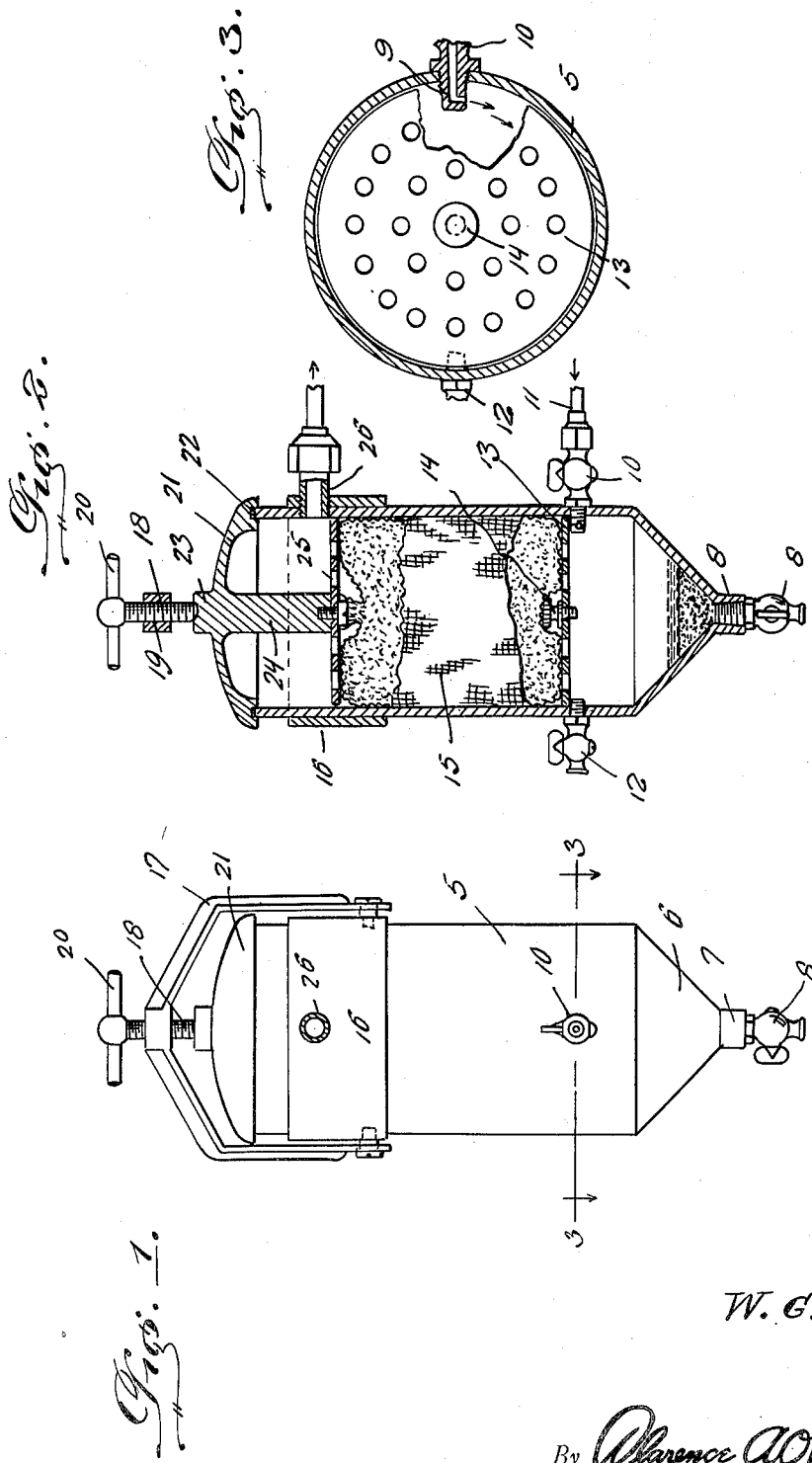

1,632,461

UNITED STATES PATENT OFFICE.

WILLIAM GORDON BURHANS, OF KINGSTON, NEW YORK.

OIL FILTER.

Application filed November 2, 1926. Serial No. 145,829.

This invention relates to new and useful improvements in oil filters, primarily though not specifically adapted for use in automobile engine lubricating systems.

The primary object of the invention resides in the provision of a highly novel, simple, and efficient oil filter that may be readily installed within the oil line of an automobile engine and that is so constructed as to positively separate water and other foreign matter from the oil before the same passes to the working parts of the automobile engine.

A further and most important object of the invention is to provide a filter of this character wherein the filtering material may be readily removed from the filter casing whenever the same becomes useless for further filtering operation.

Yet another object is to provide a filter of this character wherein the filter body is provided with a removable head that is so constructed that when the same is disposed upon the body, the filtering material that has been previously placed into the body will become thoroughly packed therein so as to prevent any escapage of the oil between the filtering material and the said filter body.

Other objects will become apparent as the nature of the invention is better understood, the same comprising the novel form, combination and arrangement of parts hereinafter more fully described, shown in the accompanying drawing and claimed.

In the drawing wherein like reference characters indicate corresponding parts throughout the several views:

Figure 1 is a side elevation of the oil filter per se.

Figure 2 is a detail vertical section thereof, and

Figure 3 is a transverse section taken substantially upon the line 3—3 of Figure 1.

Now having particular reference to the drawing wherein there is disclosed the most preferred embodiment of the invention with which I am at this time familiar, 5 designates a hollow cylindrical body of predetermined size open at its upper end and tapered at its lower end as at 6 to provide a settling chamber for the oil and dirt and which tapered end terminates into an internally threaded sleeve 7 within which is arranged a conventional drain cock 8. Threaded within the cylindrical body 5 adjacent the lower tapered end thereof is the threaded nozzle 9 of a cock 10 in communication with which is an oil intake pipe 11. The bore of the cock nozzle 9 ends at the side of the nozzle as indicated in Figure 3 so that the oil entering the lower end of the filter body 5 will flow around the interior thereof rather than in a vertical direction which would tend to disturb the dirt and water within the settling chamber.

In opposed relation with the inlet cock 10 is an air cock 12, the threaded end of which is arranged within a threaded opening in the cylindrical body 5 as indicated in Figure 2.

Arranged within the cylindrical body 5 and supported upon the inner ends of the threaded nozzles 10 and 12 is a circular perforated plate 13 provided centrally with a pull knob 14, which plate is adapted for the support of the filtering medium 15 arranged within the cylindrical body of the filter as in Figure 2.

Arranged over the body 5 at the upper end thereof is a collar 16 to which at opposed points thereon are pivoted the arms of a U-shaped bail 17, the bight portion of which is formed centrally with a threaded vertical opening 18 within which is threaded a lid pressure applying pin 19 provided at its upper end with a handle 20. For disposition upon the open end of the body 5 is a circular lid 21 formed at its under side with a circumferential groove within which is a gasket 22 for providing an oil tight joint between the body 5 and said lid. The center of this lid 21 is formed externally with a socketed boss 23 for receiving the inner end of the threaded pin 19 when the same is turned downwardly so as to lock the lid upon the body.

This lid is formed centrally with a depending leg 24 to the lower end of which is detachably secured a circular perforated plate 25 for engagement with the upper end of the filtering material 15 for obviously compressing this filtering material when the lid is disposed upon the body and forced downwardly thereon.

Leading from the upper end of the filter body 5 above the compressing plate 25 when the same at its downward limit of movement within the body is an oil discharge pipe 26 that has communication with the working parts of the engine so as to convey the filtered oil thereto.

Obviously the oil which is fed into the body 5 at the lower end thereof will be caused to pass upwardly through the filtering material 15 and by reason thereof dirt and other foreign matter will be extracted therefrom. Any water within the oil will tend to flow to the settling chamber end of the body, and thus be prevented from passing through the pipe 26 into the motor. Whenever it is desired to remove the filtering material 15 it is only necessary to release the threaded pin 19 and then swing the bail 17 over upon the body 5 after which the lid may be removed so that access may be had to the old filtering material and new filtering material substituted in lieu thereof.

Even though I have herein shown and described the invention as consisting of certain detail structural elements, it is to be understood that minor changes may be made therein without effecting the spirit and scope of the appended claim.

Having thus described the invention, what I claim as new and desire to secure by Letters Patent is:—

In a filter of the class described, a cylindrical body open at its top, an oil inlet cock extending into the lower portion of the body, an air cock extending into the body at a point diametrically opposite the oil inlet cock, said cock being disposed in the same plane, an oil outlet extending from the upper portion of the body, a sediment drain cock arranged within an opening in the extreme lower end of the body, a perforated plate removably disposed within the body and supported on the inner ends of the oil and air cocks, filtering material disposed within the body upon said plate, a cap for the open end of the body, and means associated with the cap for compressing the filtering material between the perforated plate and the oil outlet.

In testimony whereof I affix my signature.

W. GORDON BURHANS.